(12) United States Patent
Knoop

(10) Patent No.: US 10,823,149 B2
(45) Date of Patent: Nov. 3, 2020

(54) METHOD FOR ERECTING A WIND TURBINE AND LIFTING BEAM FOR MOUNTING A ROTOR BLADE OF A WIND TURBINE

(71) Applicant: Wobben Properties GmbH, Aurich (DE)

(72) Inventor: Frank Knoop, Aurich (DE)

(73) Assignee: Wobben Properties GmbH, Aurich (DE)

(*) Notice: Subject to any disclaimer, the term of this patent is extended or adjusted under 35 U.S.C. 154(b) by 0 days.

(21) Appl. No.: 16/309,028

(22) PCT Filed: Jun. 19, 2017

(86) PCT No.: PCT/EP2017/064869
§ 371 (c)(1),
(2) Date: Dec. 11, 2018

(87) PCT Pub. No.: WO2017/220459
PCT Pub. Date: Dec. 28, 2017

(65) Prior Publication Data
US 2019/0309730 A1    Oct. 10, 2019

(30) Foreign Application Priority Data

Jun. 23, 2016  (DE) .......................... 10 2016 111 514

(51) Int. Cl.
*F03D 13/10* (2016.01)
*B66C 1/34* (2006.01)
(Continued)

(52) U.S. Cl.
CPC .............. *F03D 13/10* (2016.05); *B66C 1/108* (2013.01); *B66C 1/34* (2013.01); *B66C 13/06* (2013.01);
(Continued)

(58) Field of Classification Search
CPC .. B66C 1/108; B66C 1/16; B66C 1/34; B66C 1/105; B66C 13/06; B66C 23/185;
(Continued)

(56) References Cited

U.S. PATENT DOCUMENTS 4,950,012 A * 8/1990 Jones ................... B66C 1/105
                                                    294/67.2
7,014,172 B2   3/2006 Kataoka
(Continued)

FOREIGN PATENT DOCUMENTS

CN      100341772 C     10/2007
CN      101565091 A     10/2009
(Continued)

OTHER PUBLICATIONS

Ematec®, "Rotor Blade Traverse", 2014, extract from the brochure of the company Ematec, Rotorblatttraverse, (with machine translation, 8 pages).

*Primary Examiner* — Dean J Kramer
(74) *Attorney, Agent, or Firm* — Seed Intellectual Property Law Group LLP

(57) ABSTRACT

A method of erecting a wind power installation which has an aerodynamic rotor having rotor blade connections. A lifting beam having a ballast unit is fixed to a crane hook of a crane. A rotor blade is fixed to a second crane hook at an underside of the ballast unit by means of lifting cables. The lifting beam and the rotor blade are lifted by the crane for mounting the rotor blade at one of the rotor blade connections.

2 Claims, 4 Drawing Sheets

(51) Int. Cl.
*B66C 13/06* (2006.01)
*B66C 23/20* (2006.01)
*B66C 23/72* (2006.01)
*F03D 1/06* (2006.01)
*B66C 1/10* (2006.01)

(52) U.S. Cl.
CPC ............ *B66C 23/207* (2013.01); *B66C 23/72* (2013.01); *F03D 1/0658* (2013.01); *F05B 2230/61* (2013.01); *Y02E 10/721* (2013.01); *Y02E 10/726* (2013.01)

(58) Field of Classification Search
CPC ....... B66C 23/207; B66C 23/72; B66C 23/74; F03D 13/10; F05B 2230/61
USPC ..... 294/67.1, 67.5, 81.1, 81.3; 212/272, 195
See application file for complete search history.

(56) References Cited

U.S. PATENT DOCUMENTS

| | | | |
|---|---|---|---|
| 7,207,777 B2 | 4/2007 | Bervang | |
| 7,708,325 B2* | 5/2010 | Grant | B66C 13/08 294/81.3 |
| 8,052,396 B2 | 11/2011 | Wobben | |
| 8,191,721 B2* | 6/2012 | Hansen | B66C 1/108 212/273 |
| 8,840,158 B2* | 9/2014 | Leibovitz | B66C 1/105 294/67.5 |
| 9,533,861 B2* | 1/2017 | Esteban Fink | B66C 1/10 |
| 2008/0307647 A1* | 12/2008 | Kessler | B66C 1/108 29/889 |
| 2010/0254813 A1 | 10/2010 | Dawson et al. | |
| 2011/0042632 A1 | 2/2011 | Van Berlo et al. | |
| 2013/0315740 A1* | 11/2013 | Westergaard | F03D 1/0675 416/204 R |
| 2014/0245580 A1* | 9/2014 | Meyer | F03D 1/065 29/23.51 |
| 2015/0300175 A1* | 10/2015 | Pfeiffer | F03D 1/0658 29/889.1 |
| 2015/0345465 A1* | 12/2015 | Westergaard | B66C 1/108 29/889.21 |
| 2016/0002010 A1 | 1/2016 | May | |

FOREIGN PATENT DOCUMENTS

| | | |
|---|---|---|
| CN | 201593181 U | 9/2010 |
| CN | 102442410 A | 5/2012 |
| CN | 105270986 A | 1/2016 |
| CN | 105492366 A | 4/2016 |
| EP | 1577254 A1 | 9/2005 |
| EP | 1507975 B1 | 3/2006 |
| EP | 3034450 A1 | 6/2016 |
| GB | 1002758 | 8/1965 |
| JP | 2006-152862 A | 6/2006 |
| JP | 2015-075037 A | 4/2015 |
| KR | 10-1334339 B1 | 11/2013 |
| KR | 10-1358229 B1 | 2/2014 |
| RU | 2235054 C2 | 8/2004 |
| UA | 84787 C2 | 11/2008 |
| WO | 2008/155976 A1 | 12/2008 |

* cited by examiner

METHOD FOR ERECTING A WIND TURBINE AND LIFTING BEAM FOR MOUNTING A ROTOR BLADE OF A WIND TURBINE

BACKGROUND

Technical Field

The present invention concerns a method of erecting a wind power installation and a lifting beam for mounting a rotor blade of a wind power installation.

Description of the Related Art

When mounting the rotor blades of a wind power installation, the rotor blades are exposed to the weather conditions without being protected. In accordance with EN 13000 mounting of rotor blades of a wind power installation is permissible only up to a given wind speed. If that wind speed should be exceeded then the rotor blade may not be mounted.

On the German patent application from which priority is claimed the German Patent and Trade Mark Office searched the following document: Prospekt Rotorblatttraverse Ematec, 1014.

BRIEF SUMMARY

Provided is a method of erecting a wind power installation, which can be effected even at higher wind speeds.

Thus there is provided a method of erecting a wind power installation which has an aerodynamic rotor having rotor blade connections. A lifting beam has a ballast unit and is fixed to a crane hook of a crane. A rotor blade is fixed to a second crane hook at an underside of the ballast unit by means of lifting cables. The lifting beam and the rotor blade are lifted by the crane for mounting the rotor blade at one of the rotor blade connections. The ballast unit serves to increase the overall weight of the lifting beam so that a rotor blade can be mounted even at higher wind speeds.

According to an aspect of the present invention the ballast unit has at least one ballast weight and the ballast weight is so selected that the ratio between the area of the rotor blade and the sum of the ballast weight and the weight of the rotor blade ≤1.

According to an aspect of the present invention there is provided a winch unit at the rotor of the wind power installation. The rotor blade root of the rotor blade to be mounted is fixed to a hook of the winch unit. The rotor blade is lifted by means of the winch unit and the crane.

The present invention also concerns a lifting beam for mounting a rotor blade of a wind power installation. The lifting beam has a ballast unit and at least one suspension point for receiving a crane hook at a top side of the ballast unit. The lifting beam further has a hook at the underside of the ballast unit, and a ballast weight.

According to an aspect of the present invention a rotor blade of the wind power installation is fixed to a crane hook by way of a lifting beam in order then subsequently to raise the rotor blade. The lifting beam has a ballast unit having at least one ballast weight. The use of ballast weights in the lifting beam when mounting the rotor blades serves to increase the overall weight (rotor blade+lifting beam). An increase in the weight to be transported by the crane initially appears to be counterproductive but has the advantage that in that way the ratio between the area of the rotor blades to the load of the rotor blades is increased.

The formula for calculating the maximum permissible wind speeds when mounting the rotor blades depends on the mobile crane being used and is ascertained in accordance with EN 13000. In particular the ratio of the area of the component to be mounted to the load of the component is of great significance. At the maximum permissible wind speed the ratio of area to load may not be greater than 1. With the modern rotor blades of wind power installations however that ratio can be markedly greater than 1.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
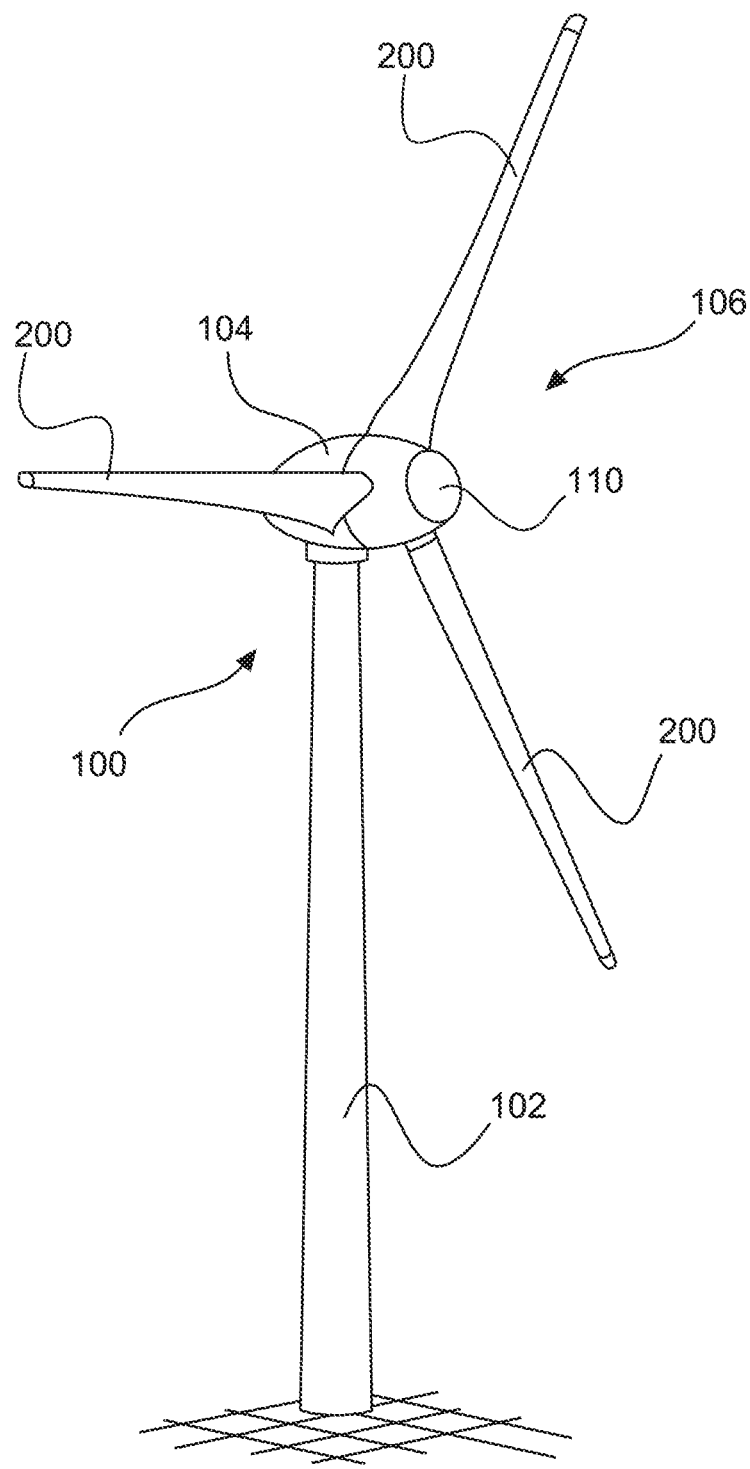
FIG. 1 shows a diagrammatic view of a wind power installation according to the invention.

FIG. 1 shows a diagrammatic view of a wind power installation. FIG. 1 shows a wind power installation 100 having a pylon 102 and a pod 104. A rotor 106 having three rotor blades 200 and a spinner 110 is arranged at the pod 104. The rotor 106 is caused to rotate by the wind in operation and thereby drives a generator in the pod 104.

Figure 2:
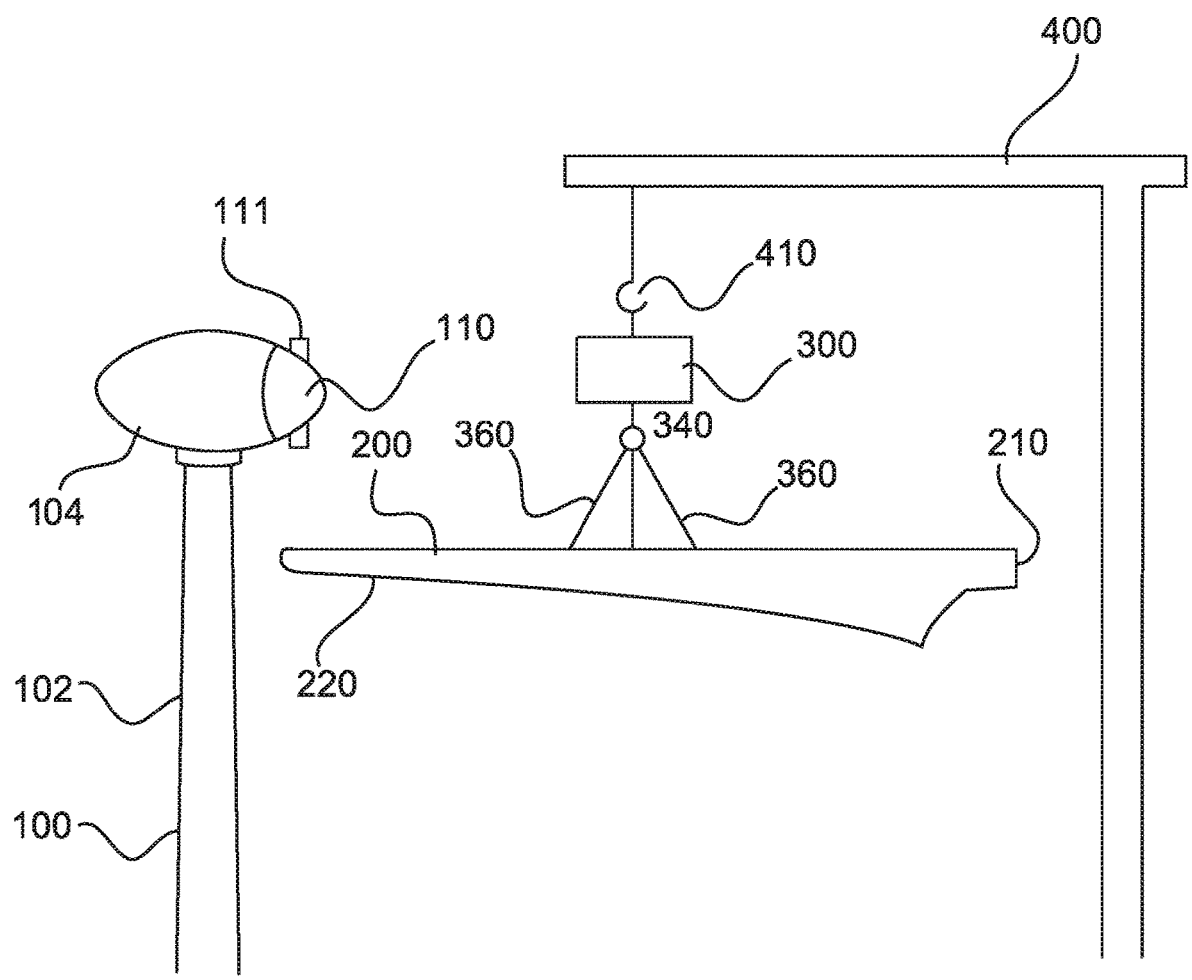
FIG. 2 shows a diagrammatic view of a wind power installation when mounting a rotor blade according to a first embodiment of the invention.

FIG. 2 shows a diagrammatic view of a wind power installation when mounting a rotor blade according to an embodiment of the invention. The wind power installation 100 has a pylon 102, a pod 104 and a spinner 110. The rotor blade connections 111 are provided on the spinner. The rotor blade 200 has a rotor blade root 210 and a rotor blade tip 220. By means of a crane 400 and a first hook (crane hook) 410 a lifting beam 300 having a second hook 340 lifts a rotor blade 200 to fix the rotor blade 200 to the spinner 110 of the wind power installation 100. The crane hook 410 is coupled to a lifting beam 300 which has a second crane hook 340, by way of which the rotor blade 200 is lifted by means of lifting cables 360. The crane 400 therefore has to lift both the rotor blade 200 and also the ballast unit or the lifting beam 300.

The lifting beam having a ballast unit 300 is used to increase the weight to be lifted by the crane 400. The invention is based on the notion that, by increasing the weight to be lifted by the crane 400, the ratio between the area of the component to be mounted (here a rotor blade) to the weight of the component is reduced, by virtue of the weight to be lifted being increased by the ballast weight of the ballast unit 300. It is possible in that way to ensure that the rotor blade can be mounted even at higher wind speeds.

Figure 3:
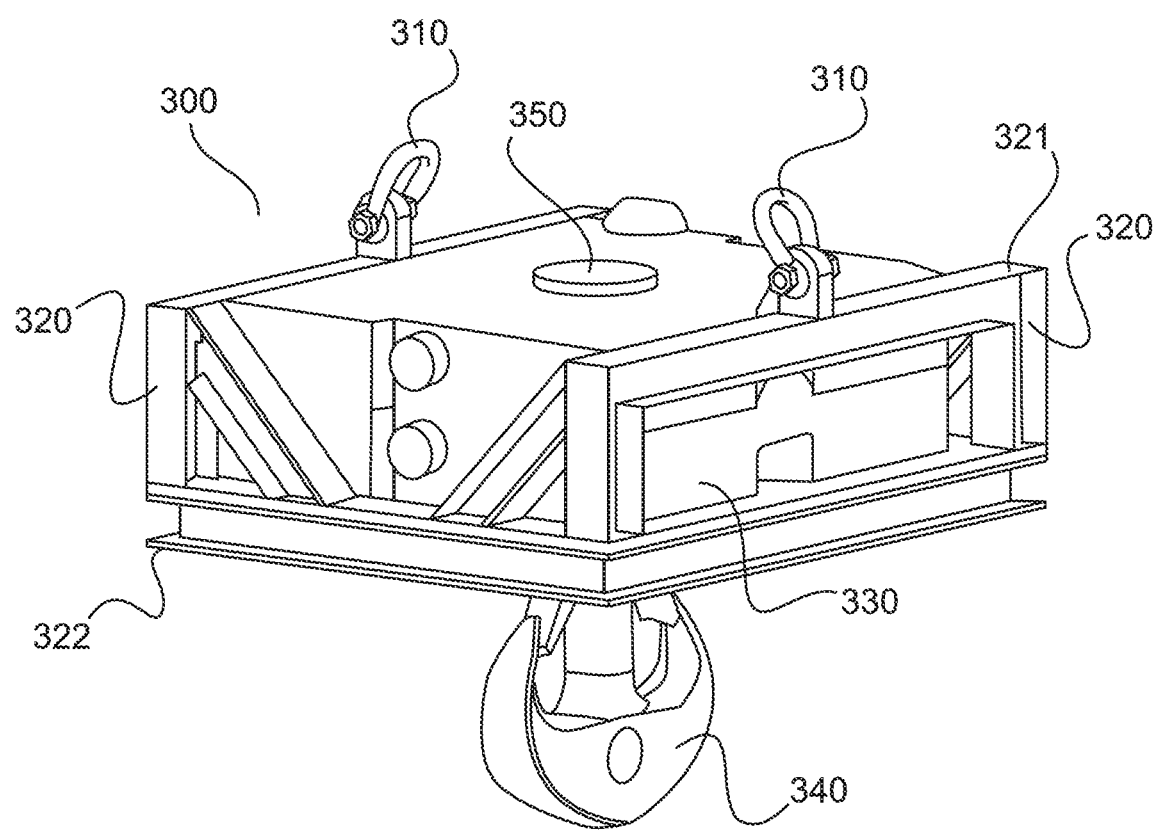
FIG. 3 shows a diagrammatic view of a lifting beam according to the invention.

FIG. 3 shows a diagrammatic view of a lifting beam according to the invention. At its upper side the lifting beam 300 has at least one and preferably two suspension points 310, by means of which the lifting beam is to be fixed to a crane hook 410. Optionally the lifting beam 300 can have a frame 320 for receiving ballast weights 330. Provided at the underside of the lifting beam 300 is a second crane hook 340, to which the lifting cables 360 for the rotor blade 200 can be fixed. That second crane hook 340 can be rotatable. Abutment points 321 for guide cables can be provided on the frame 320. According to an aspect of the present invention a security unit 350 can be provided, which secures the ballast weights 330 in the mounted state.

The ballast weights 330 can be fixed within the frame.

According to an aspect of the present invention a parking means or a parking unit 322 can be provided, by means of which the lifting beam can be set down on the ground even when the second crane hook 340 is mounted.

Calculation of the permissible wind speed for lifting a rotor blade is explained hereinafter:

$$A_W = A_p * c_W$$

$$A_W = 135 \text{ m}^2 \cdot 1.1$$

$$A_W = 148.5 \text{ m}^2$$

[Formula for Calculating the Wind Engagement Area]

$$V_{max} = V_{max\,Tab} * \sqrt{\frac{1.2\frac{m^2}{t} * m_H}{A_W}}$$

$$V_{max1} = 9\frac{m}{s} * \sqrt{\frac{1.2\frac{m^2}{t} * 30t}{148.5 \text{ m}^2}}$$

[Formula for Calculating the Permissible Wind Speed]

$$V_{max1} = 4.43\frac{m}{s}$$

(Maximum Permissible Wind Speed for the Hub of a Rotor Blade)

Calculation of the permissible wind speed for lifting a rotor blade and increasing the mass by using an additional lifting beam with ballast weights of the mounting crane is carried out as follows:

$$A_W = 148.5 \text{ m}^2$$

(Assuming the Wind Engagement Area does not Change Although there is a Distribution Between Auxiliary Winch and Mounting Crane)

$$V_{max2} = 9\frac{m}{s} * \sqrt{\frac{1.2\frac{m^2}{t} * 80t}{148.5 \text{ m}^2}}$$

(Assuming the Crane has a Lift Capacity of 80 t which is Also Needed to Mount the Pod Components)

$$V_{max2} = 7.24\frac{m}{s}$$

(Maximum Permissible Wind Speed for Lifting a Rotor Blade by Using Added Ballast)

Figure 4:
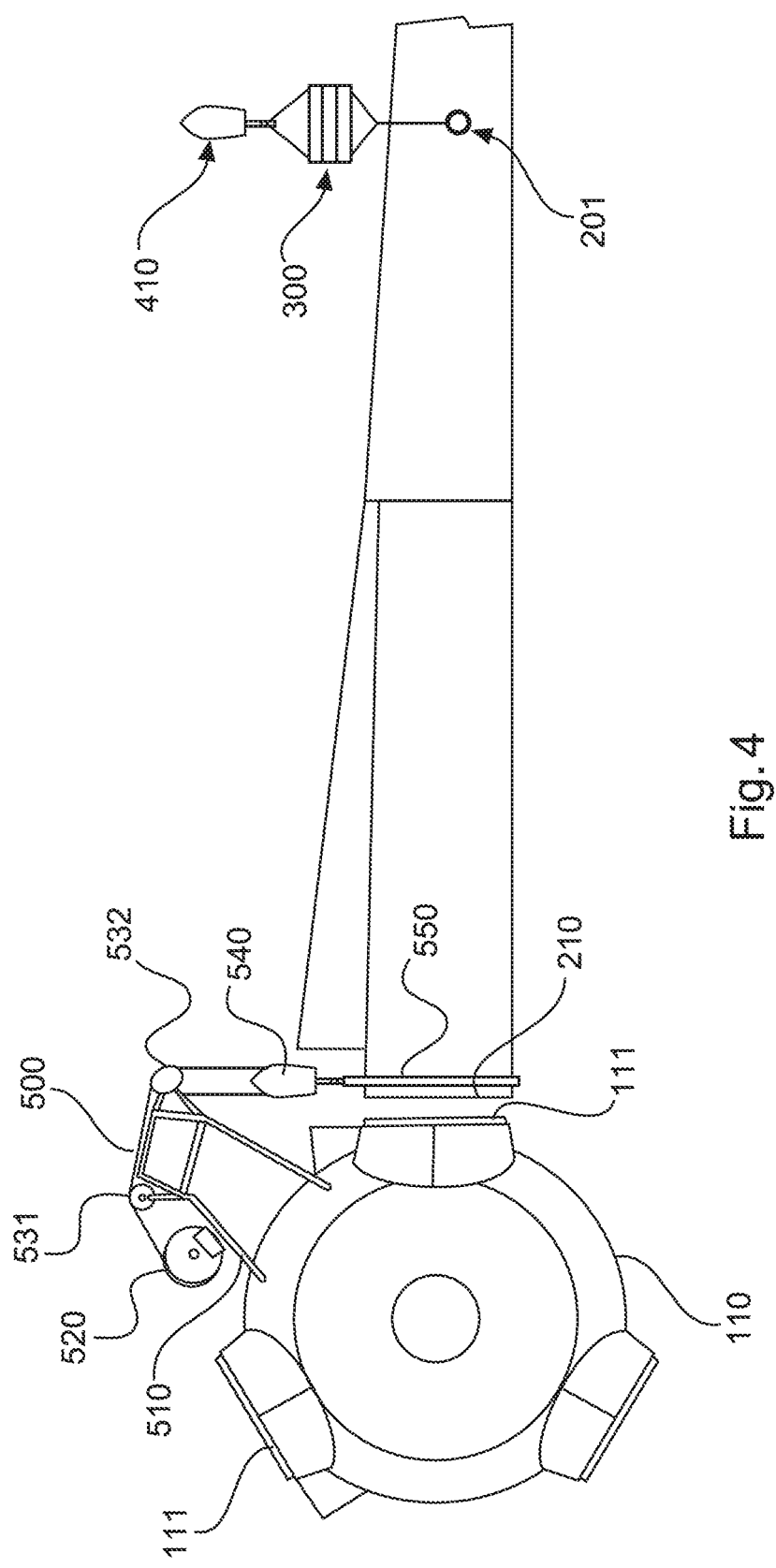
FIG. 4 shows a diagrammatic view of a part of a wind power installation according to a second embodiment of the invention.

FIG. 4 shows a diagrammatic view of a part of a wind power installation according to a second embodiment of the invention. FIG. 4 shows a spinner 110 of the wind power installation 100 together with a winch unit 500. The winch unit 500 can be fixed to the spinner 110 and has a frame 510, a winch 520 and two direction-changing rollers 531, 532. The winch unit 500 further has a hook 540. A rotor blade root 210 of a rotor blade 200 to be mounted can be fixed to the hook 540, for example by means of a sling 550. A crane with its crane hook 410 can lift a lifting beam 300 in accordance with the first embodiment, which in turn is connected by way of a lifting cable to the rotor blade 200 and in particular a pick-up point 201. The rotor blade 200 is thus lifted by means of the crane and the winch unit 500. That is advantageous because it is possible in that way to dispense with a guide means with cable winches. That is found to be particularly advantageous for forest sites.

The calculation of the permissible wind speed for lifting a rotor blade and increasing the mass by using an additional lifting beam having ballast weights of the mounting crane, and taking account of the distribution of load between an ancillary device and the mounting crane, is effected as follows:

$$A_{W1} = \tfrac{2}{3} 135 \text{ m}^2 \cdot 1.1$$

$$A_W = 99 \text{ m}^2$$

[Assuming that ⅔ of the Area Act on the Crane]

$$A_{w2} = 5 \text{ m}^2 * 1.6$$

$$A_{W2} = 8 \text{ m}^2$$

$$V_{max3} = 9\frac{m}{s} * \sqrt{\frac{1.2\frac{m^2}{t} * 80t}{107 \text{ m}^2}}$$

$$V_{max3} = 8.5\frac{m}{s}$$

(Area of the Lifting Beam with Additional Ballast)

According to the invention the permissible maximum speed can be considerably increased by means of the lifting beam when mounting the rotor blades. The maximum permissible wind speed can be increased from 4.4 m² to 7.2 m² by using the lifting beam with the ballast unit. If the winch unit is used in accordance with an aspect of the present invention the permissible wind speed can be increased to 8.5 m/s. That is particularly advantageous because in that way the rotor blade can be mounted even at relatively high wind speeds.

The invention claimed is:

1. A method of erecting a wind power installation having an aerodynamic rotor blade having a plurality of rotor blade connections, the method comprising:
   selecting at least one ballast weight so that a predetermined ratio in meters squared per ton between a surface area of the rotor blade and a sum of both the at least one ballast weight and a weight of the rotor blade is equal to or less than 1;
   fixing the at least one ballast weight to a lifting beam;
   fixing the lifting beam with the at least one ballast weight to a crane hook of a crane;
   fixing a rotor blade by lifting cables to a second crane hook at an underside of the at least one ballast weight; and
   lifting the lifting beam with the at least one ballast weight and the rotor blade by the crane for mounting the rotor blade at one of the plurality of rotor blade connections.

2. The method according to claim 1, comprising:
prior to lifting the beam with the at least one ballast weight and the rotor blade by the crane, fixing a rotor blade root of the rotor blade to a hook of a winch unit; and
wherein lifting the rotor blade comprises lifting the rotor blade by the winch unit and the crane.

\* \* \* \* \*